United States Patent
Gagne et al.

(10) Patent No.: US 6,581,143 B2
(45) Date of Patent: *Jun. 17, 2003

(54) DATA PROCESSING METHOD AND APPARATUS FOR ENABLING INDEPENDENT ACCESS TO REPLICATED DATA

(75) Inventors: Mathieu Gagne, Boston, MA (US); Yuval Ofek, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/142,164

(22) Filed: May 9, 2002

(65) Prior Publication Data

US 2002/0129203 A1 Sep. 12, 2002

Related U.S. Application Data

(63) Continuation of application No. 09/471,848, filed on Dec. 23, 1999, now Pat. No. 6,401,178.

(51) Int. Cl.7 .............................................. G06F 12/00
(52) U.S. Cl. ........................ 711/162; 711/161; 711/144; 711/145
(58) Field of Search ................................. 711/162, 161, 711/144, 145; 707/10, 204; 714/5, 6

(56) References Cited

U.S. PATENT DOCUMENTS

| | | | | |
|---|---|---|---|---|
| 5,511,177 A | | 4/1996 | Kagimasa et al. ............ 395/441 |
| 5,592,660 A | * | 1/1997 | Yokota et al. ................ 705/42 |
| 5,596,745 A | * | 1/1997 | Lai et al. ................ 707/103 R |
| 5,649,089 A | * | 7/1997 | Kilner ........................ 707/204 |
| 5,742,792 A | | 4/1998 | Yanai et al. ................ 395/489 |
| 5,793,867 A | * | 8/1998 | Cordery et al. ............... 705/60 |
| 5,799,147 A | * | 8/1998 | Shannon ...................... 714/15 |
| 5,822,434 A | * | 10/1998 | Caronni et al. ............. 713/156 |
| 5,987,566 A | | 11/1999 | Vishlitzky et al. .......... 711/114 |
| 6,044,444 A | | 3/2000 | Ofek .......................... 711/162 |
| 6,101,497 A | | 8/2000 | Ofek ........................... 707/10 |
| 6,112,257 A | | 8/2000 | Mason, Jr. et al. ........... 710/18 |
| 6,131,148 A | | 10/2000 | West et al. .................. 711/162 |
| 6,173,377 B1 | | 1/2001 | Yanai et al. ................ 711/162 |
| 6,199,065 B1 | | 3/2001 | Kenyon ....................... 707/10 |
| 6,209,002 B1 | | 3/2001 | Gagne et al. ............... 707/204 |
| 6,237,008 B1 | | 5/2001 | Beal et al. .................. 707/204 |
| 6,253,295 B1 | | 6/2001 | Beal et al. .................. 711/162 |
| 2002/0016827 A1 | * | 2/2002 | McCabe et al. ............ 709/213 |

* cited by examiner

Primary Examiner—Matthew Kim
Assistant Examiner—Stephen Elmore
(74) Attorney, Agent, or Firm—George A. Herbster (57) ABSTRACT

A data storage facility that allows data on a standard device to be replicated to other storage devices for independent and concurrent access. The standard device includes first and second tables for monitoring the operation of the standard device. The other storage device that receive the copies have tables that identify their status. The system utilizes these tables in various combinations to enable multiple copies to be altered and updated.

13 Claims, 10 Drawing Sheets

| EVENT | DESCRIPTION |
|---|---|
| 230 | WRITE TO STANDARD DEVICE 31 |
| 231 | WRITE TO BCV(1) DEVICE 33 |
| 232 | WRITE TO BCV (2) DEVICE 35 |
| 233 | ESTABLISH DDF(1) WITH STANDARD DEVICE 31 AND BCV(1) DEVICE 33 |
| 234 | FULL SPLIT OF DDF(1) |
| 235 | WRITE TO STANDARD DEVICE 31 |
| 236 | ESTABLISH DDF(2) WITH STANDARD DEVICE 31 AND BCV(2) DEVICE 35 |
| 237 | FULL SPLIT OF DDF(2) |
| 240 | WRITE TO STANDARD DEVICE 31 |
| 241 | REESTABLISH DDF(1) |
| 242 | INCREMENTAL RESTORE FROM BCV(2) DEVICE 35 |
| 243 | WRITE TO STANDARD DEVICE 31 |
| 244 | DIFFERENTIAL SPLIT OF BCV(2) DEVICE 35 |

FIG. 10

DATA PROCESSING METHOD AND APPARATUS FOR ENABLING INDEPENDENT ACCESS TO REPLICATED DATA

CROSS REFERENCE TO RELATED APPLICATION

This application is a continuation of co-pending U.S. patent application Ser. No. 09/471,848 filed Dec. 23, 1999, now U.S. Pat. No. 6,401,178, for Data Processing Method and Apparatus for Enabling Independent Access to Replicated Data.

U.S. Pat. No. 6,101,497 granted Aug. 8, 2000 for a Method and Apparatus for Independent and Simultaneous Access to a Common Data Set in the name of Yuval Ofek assigned to the same assignee as this invention.

U.S. Pat. No. 6,209,002 granted Mar. 27, 2001 in the name of Mathieu Gagne et al. for a Method and Apparatus for Cascading Data Through Redundant Data Storage Units assigned to the same assignee as this invention.

BACKGROUND OF THE INVENTION

1. Field of the Invention

This invention generally relates to data processing systems and more specifically to a data storage facility for use with in such data processing systems that has the capacity for replicating data for independent access and for periodically updating the data from a standard.

2. Description of Related Art

The above-identified U.S. Pat. No. 6,101,497 discloses a method and apparatus for replicating data for various purposes, all with minimum interruption to normal data processing activities. In one specific implementation, a data storage facility uses a business continuation volume (BCV) concept. Under this concept an ESTABLISH command from a host to a disk storage facility with a BCV capability effects a relationship between a first logical volume (hereinafter a "standard volume") and a second logical volume (hereinafter a "BCV volume"). The storage facility copies data from the standard volume to the BCV volume in a orderly fashion and transparently to any host applications. That is, a host application or program can continue to communicate normally with the standard volume using conventional I/O requests even as data is being copied from the standard volume to a BCV volume.

When the BCV volume has an exact copy of the data from the standard volume, the BCV volume is "synchronized" and the data has been replicated. Once synchronized, a SPLIT command can separate the BCV volume for other uses independently of the activity between the standard volume and its host applications. Specifically, the BCV volume can interact with an other application program, such as a development program under test or a backup program, without any danger of corrupting any data on the standard volume. During these independent operations the application associated with the standard volume can alter that data while the other application can alter the replicated data on the BCV volume. Each change occurs with respect to a track or other data block. During these operations, the location, or track, of each change is also identified.

When it is desired to update the data on the BCV volume with the data on the standard device, one of two methods are used. In a first, the ESTABLISH command causes all the data in the standard device to be copied to the BCV volume. The second method is more efficient. A RE-ESTABLISH command identifies all the locations or tracks on which data was changed in the standard and BCV volumes since a previous SPLIT operation. The RE-ESTABLISH command then causes only that data to be transferred from the standard device to the BCV device that has been changed on either the standard or BCV volume. As will be apparent, if fewer than 100% of all the tracks are changed, the RE-ESTABLISH method reduces the time for bringing the BCV volume into synchronism with the standard volume.

The use of BCV volumes with various commands as disclosed in the above-identified patent has proved to be a very powerful tool for data processing. It provides individuals with flexibility in the handling of data and, by virtue of the ability to replicate data with minimum interference to normal operations, increases the reliability of the overall data processing system. Recently, however, new requirements have emerged that make it highly desirable to replicate data onto multiple BCV volumes with repeated updates of the replicated data.

The presently available system is constrained. If two BCV volumes are established and split, the RE-ESTABLISH command can only be used to connection with the most recently defined STANDARD-BCV device pair. This constraint is imposed because changes in the standard device are not maintained separately for each BCV device. Otherwise the REESTABLISH command is rejected. Assume for example it was desired to establish a STANDARD-BCV pair for a first BCV volume (i.e., a standard STD-BCV(1) pair), to split that pair, establish an STD-BCV(2) pair, split that pair, and then update the BCV(1) volume. With the prior system it was necessary to process the ESTABLISH command to update the BCV(1) volume.

The time required to transfer all the data in response to such an ESTABLISH command can greatly exceed the time to transfer the data in response to the REESTABLISH command. Therefore, it is highly desirable to provide a method and apparatus that would permit the use of the REESTABLISH command with multiple standard STD-BCV pairs without regard to any foregoing command sequence.

SUMMARY

Therefore it is an object of this invention to provide a data storage facility that allows data on a standard device to be replicated to multiple storage devices whereby the data in each copy can be updated on a periodic basis in an efficient manner.

Another object of this invention is to provide a data storage facility that allows data on a standard device to be replicated to multiple storage devices and that enables copies to be updated by transferring from the standard device only that data necessary to reflect the changes that occurred to the data in the standard and copied other storage device.

Yet another object of this invention to provide a data storage facility that allows multiple copying of data from a standard device and the updating of those copies efficiently and transparently to any interaction between a host device and the data in the standard device.

In accordance with one aspect of this invention, a data storage facility comprises first, second and third data stores that interact individually with first, second and third programs respectively. Each of the second and third data stores can be selectively connected as mirrors for the first data store at different times. Each of the second and third data stores can also be detached or split from the first data store at different times whereupon they are enabled to interact with the second and third programs respectively. When it is desired to update the data in one of the second and third data stores, it is re-established as a mirror, but only the data that has changed in the corresponding second or third data store and the data that has changed in the first data store are transferred.

In accordance with another aspect of this invention, a data processing system has a first application program adapted to interact with data in a first storage device located on the first physical disk storage unit. At least two additional programs can be enabled to interact concurrently and independently with copies of that same data. Specifically, the system identifies additional storage devices on different physical disk storage units for each of the additional programs. A session reference for each of the additional storage devices has entries for recording each change made to a corresponding portion of the data on the first storage device. A device reference is also established for the first and each additional storage device with entries for recording each change a respective programs makes to a data portion on the corresponding storage device. Independent copies are generated for transfer to the other storage devices and for use by their respective additional programs. Each time a program makes a change in a data portion, that event is recorded in the device change reference associated with the program and data storage device while the systems are operating independently. On demand updating of a copy occurs with a selected storage device by combining the entries in the corresponding session and device change references to identify changed data portions and to control the data that is transferred from the first storage device to the selected storage device.

In accordance with another aspect of this invention, a multiprocessor data processing system includes a data storage facility wherein one program operates with data in one data storage device and a plurality of other programs wherein each other program interacts with another data storage device. Multiple copies of the data from the one storage device are made on each of the additional data storage devices for operation with their corresponding programs. The interaction between these devices includes defining a first buffer for each additional storage device on which a copy is to be made and a second buffer for each additional storage device and the one storage device. Data from the one storage device is copied to one of the additional data storage devices thereby to enable another program to interact with the data copy on the additional data storage device independently of the data and of the program being utilized with the one data storage device. Each change made by the one program to data on the one storage device and by the other program to the corresponding additional storage device is recorded in the first and second buffers respectively. Upon completion of independent operation, the information in the corresponding first and second buffers can be combined to identify data to be copied from the one data storage device to one additional storage device thereby to enable the data to be copied so the data in the additional storage device replicates the data in the one data storage device.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
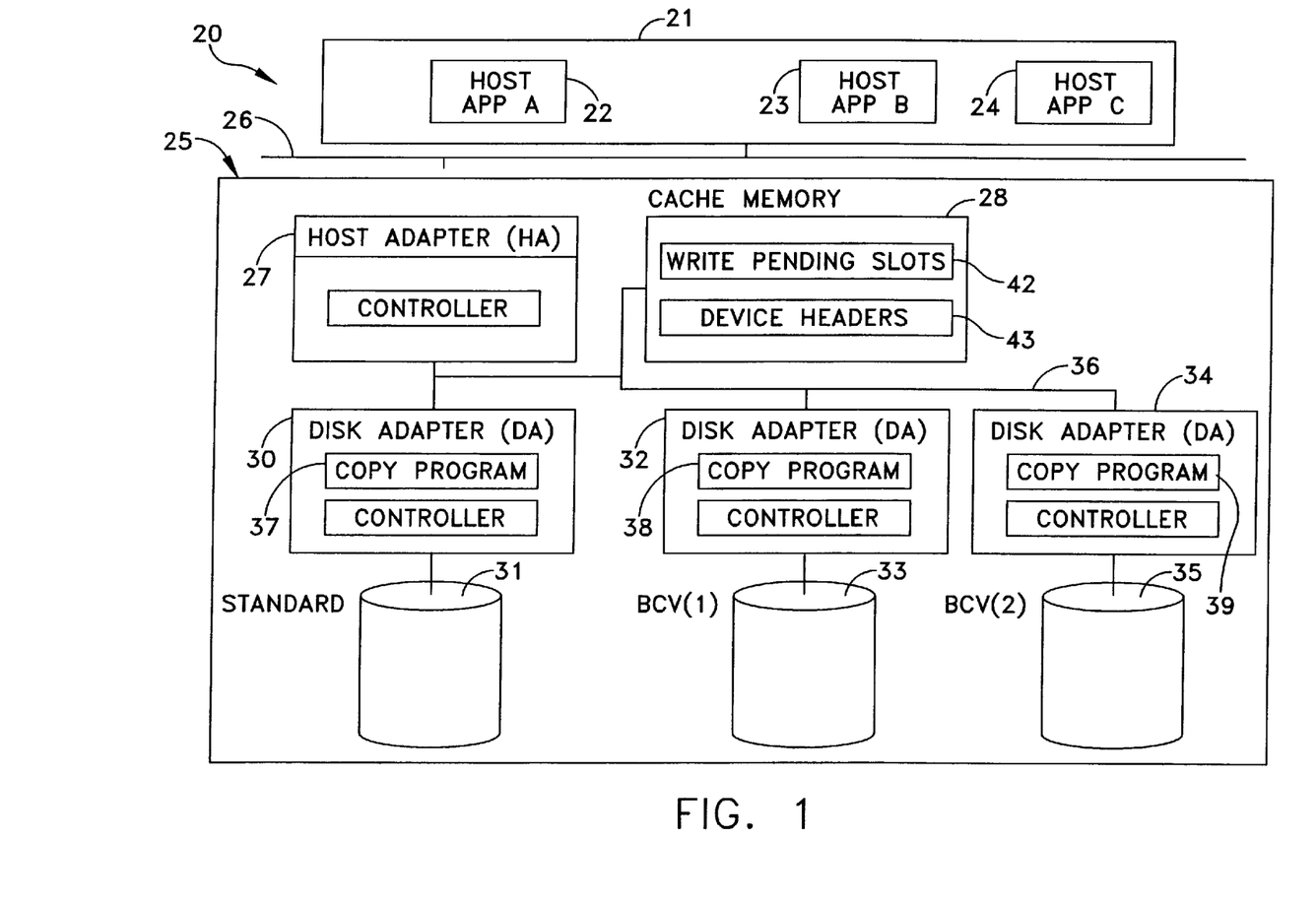
FIG. 1 is a block diagram of a data processing system constructed in accordance with this invention.

FIG. 1 depicts a data processing system 20 in which a multiprocessor host array 21 with one or more host devices controls operations. Each host device processes a program and in the following discussion "host application" means a particular application program, procedure, process, module or the like being processed on a host. FIG. 1 depicts three such applications, namely: a HOST APP A application 22, a HOST APP B application 23 and a HOST APP C application 24.

Each host application accesses and processes data stored in a data storage facility 25 over a system bus 26 that can take any of several known forms including single and parallel bus structures. For purposes of this explanation the data storage facility 25 can be considered to store all the data that will be processed any of the HOST APP A, HOST APP B or HOST APP C applications 22, 23 and 24.

This invention can be implemented in a number of disk storage facilities of different types and configurations. The following description is made in the context of a specific data storage facility 25, namely a Symmetrix disk array storage device (DASD). However, the adaption of this specifically described embodiment to other devices will be readily apparent to persons of ordinary skill in the art.

A Symmetrix disk array storage device as a data storage facility 25 includes a host adapter 27 and a cache memory 28 that communicate with each other and with a series of disk adapters and physical disk drives. FIG. 1 depicts, for example, a first disk adapter (DA) 30 with an array of physical disks that store one or more logical volumes including a logical volume 31; a disk adapter 32, a logical volume 33; and a disk adapter 34, a logical volume 35. For purposes of explaining this invention it is assumed that a physical device stores a logical volume. Although FIG. 1 depicts only a single storage device attached to each disk adapter, it will be apparent that each disk adapter can control the operation of multiple physical disk storage units and access to multiple logical volumes.

As is known, however, a logical volume may comprise a portion of a single physical device, a complete physical device, portions of multiple physical devices or even multiple complete physical devices. The following are used in this description. In the context of FIG. 1 a "standard device" refers to the logical volume 31 while "BCV(1) device" and "BCV(2) device" refer to the logical volumes 33 and 35 respectively.

A bus 36 interconnects the host adapter 27, the cache memory 28 and disk adapters including the disk adapters 30, 32 and 34. Each of the adapters 27, 30 32, and 34 includes a programmable control for performing various operations in response to commands. In addition each disk adapter includes a copy program, such as copy programs 37, 38 and 39 in the disk adapters 30, 32 and 34, respectively.

Figure 2:
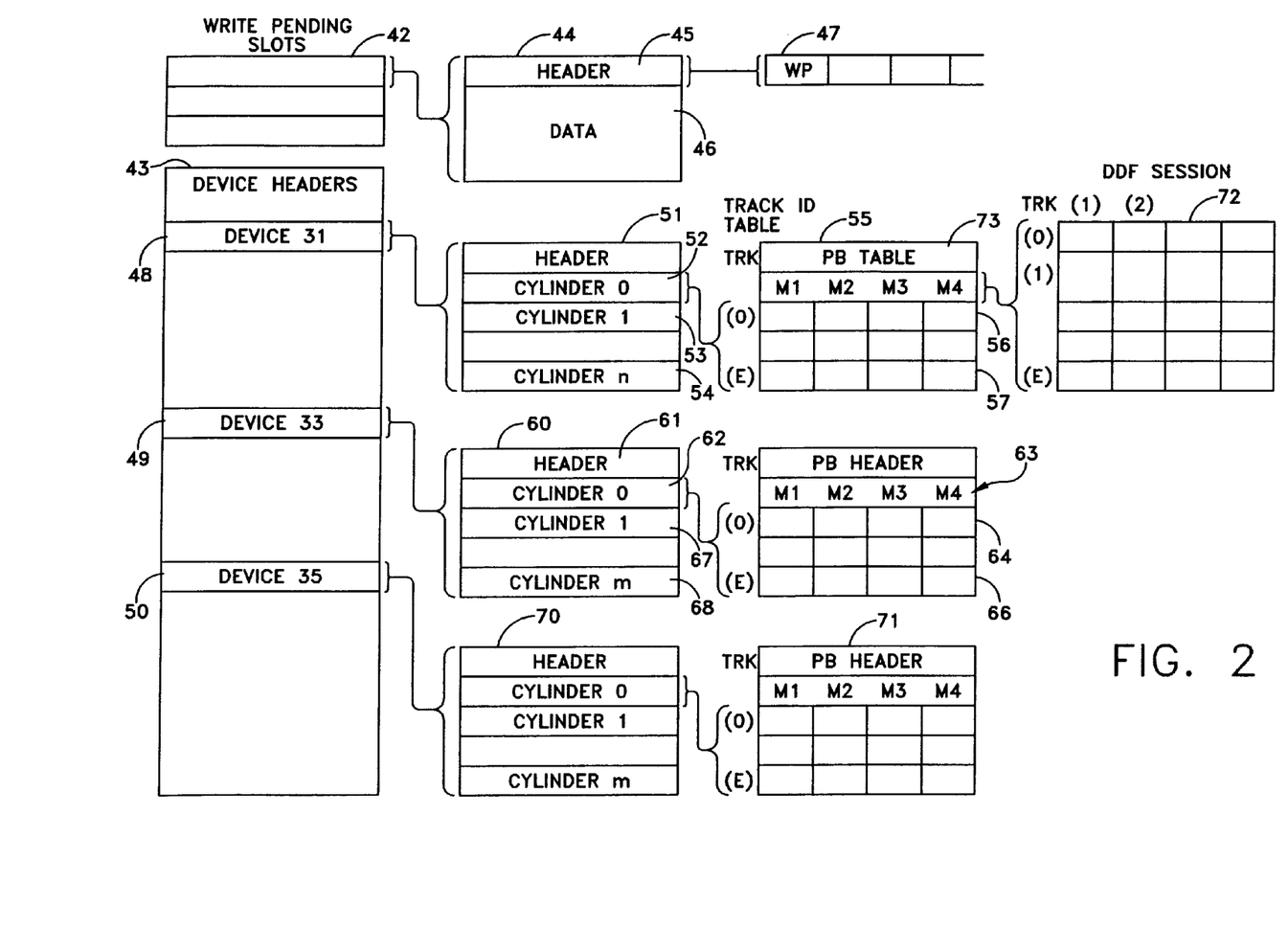
FIG. 2 depicts a data organization that is used in the data processing system of FIG. 1.

FIG. 2 depicts in detail those portions of the cache memory 28 that are relevant to this invention, particularly with respect to write pending slots 42 and device headers 43, also shown in FIG. 1. Use of data structures within a cache memory as write pending slots and device headers is generally well-known in the art. An individual write pending slot, such as a write pending slot 44 in FIG. 2, includes a header 45 followed by the data in a data block 46. Normally this data block will contain the data for one physical track. Each header 45 includes a WP flag 47 that indicates a need for write operations or destaging of data from one of the write pending slots 42 to some location in a physical disk device. Once the data is transferred from the cache memory 28 to a corresponding data storage device, the system clears the WP bit 47 for that slot. Each header includes other information that is not relevant to this invention and, accordingly, is not shown.

The device headers 43 include one entry for each storage device in the Symmetrix DASD. Three such entries are shown, namely: entry 48 for the standard device 31; entry 49 for the BCV(1) device 33; and entry 50 for the BCV(2) device 35. Each of these entries has the same organization. That is, the device entry 48 includes a header 51 and a plurality of entries for each cylinder in the device 31. Three specific entries are shown, namely: a Cylinder 0 entry 52, a Cylinder 1 entry 53 and a Cylinder n entry 54.

Each of the cylinder entries, such as Cylinder 0 entry 52, points to a block of locations that define a Track ID table, such as Track ID Table 55, with each location being assigned to a particular track in the cylinder. Two track entries are shown in the Track ID table 55, namely: a Track 0 entry 56 and a Track E entry 57 for individual physical devices in which each cylinder comprises fifteen data tracks.

The device entry 49 comprises a block 60 that includes a header 61 and cylinder entries. FIG. 2 depicts three particular cylinder entries including a Cylinder 0 entry 62 identifying a Track ID Table 63. The Track ID Table 63 includes, in this particular embodiment, three entries, namely: a Track 0 entry 64 and a Track E entry 66. Additional cylinder entries in the block 60 will be included. FIG. 2 depicts two such entries, namely: a Cylinder 1 entry 67 and a Cylinder m entry 68. The device entry 50 will have an analogous data structure including a block 70 with a header and cylinder entries. Each cylinder entry will point to a track table 71.

There is associated with each Track ID Table a data block or table containing "protection bits", also called a PB table. One such PB table 72 is associated with Track ID table 55 by a PB header 73. This PB table 72 can be considered as a two-dimensional array with one row for each track in a cylinder and one column for each session. Collectively, the PB tables for all the cylinders in a standard device define multiple sessions and each track in the standard device. In the following discussion "PB table 72" refers to either the individual table shown in FIG. 2 or the collection of such specific tables for all cylinders in the standard device.

In the Symmetrix disk array storage systems, each row is 2 bytes wide to define up to 16 sessions. In the following discussion a particular PB bit position will be identified in the form PB(x,y) where x indicates a track in a cylinder and y indicates a session number. FIG. 2 depicts such sessions as DDF(1) and DDF(2) sessions where DDF(n) is a designation for a session that incorporates the processes of this invention. With a sixteen-bit wide table, it is possible to define 16 sessions. However, as a PB table can be used for applications other than this invention, the number of DDF sessions may be limited. More specifically, during a DDF session creation, like the creation of other sessions, a controller associated with a standard device determines whether any "y" column is available. If one is available, the controller establishes a session identification correlated to the selected PB bit column.

In the prior art data storage facility described in U.S. Letters Patent application Ser. No. 08/842,953, an I/O request to write data to a track, a WRITE request, alters the various Track ID tables represented by the M1 through M4 bit positions in these Track ID tables. This invention uses a combination of PB tables associated with standard devices and track tables associated with standard and BCV devices to enable multiple BCV sessions with respect to a single standard device. Referring to FIG. 1, this allows data on the standard device 31 to be replicated at different times to the BCV(1) device 33 and the BCV(2) device 35. The HOST APP A application 22 continues to operate with the standard device 31. After splitting, the HOST APP B application 23 can operate with the BCV(1) device 33; and the HOST APP C application 24, with the BCV(2) device 35. As will become apparent, utilizing the combination of the PB and TRACK tables enables either of the BCV devices 33 or 35 to be updated from the standard device 31 in any order.

Figure 3:
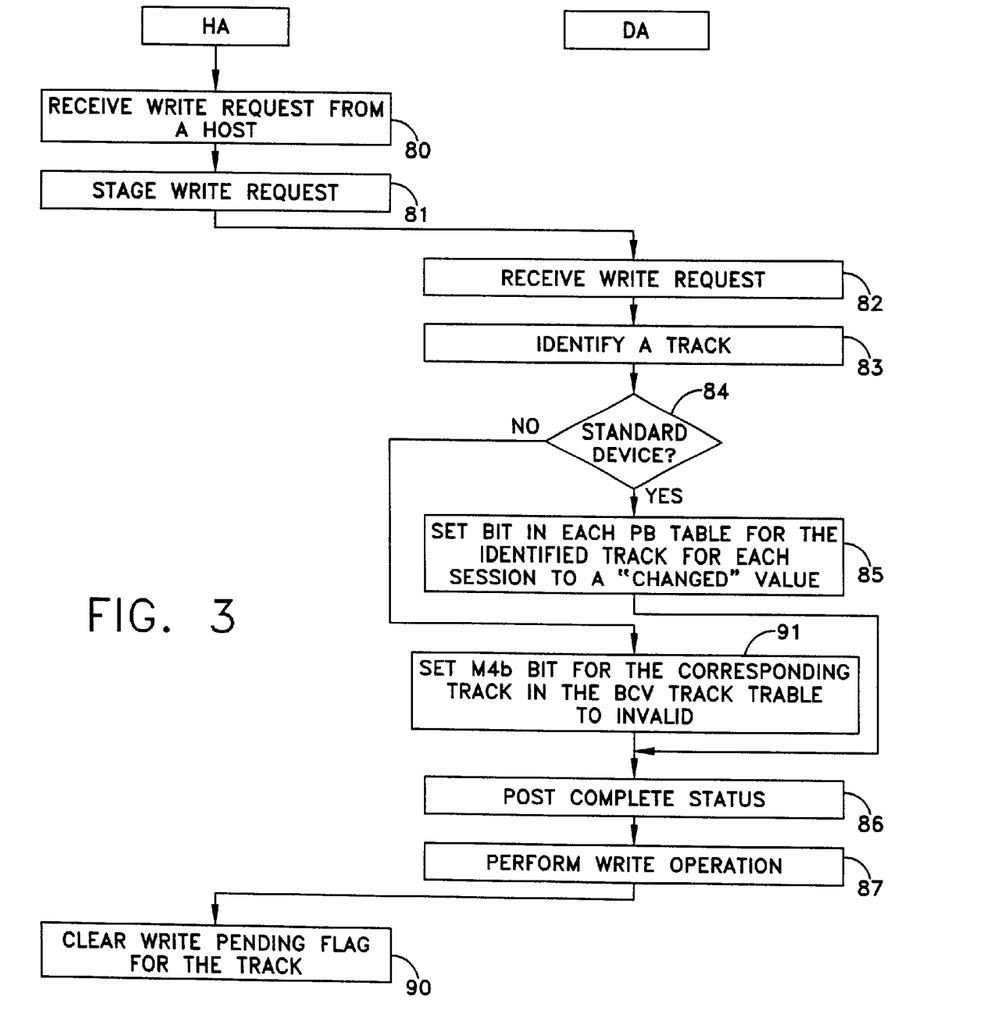
FIG. 3 is a flow diagram of responses to a WRITE REQUEST during the operation of the system of FIG. 1.

FIG. 3 depicts a modification to the operation of the data storage facility 25 in response to a WRITE request. As with prior art devices, step 80 represents the receipt of a WRITE REQUEST from one of the host applications in a host adapter (HA). Step 81 stages this request. Subsequently a disk adapter (DA) receives the WRITE request in step 82 and identifies the track to be altered.

The exact response to a WRITE request will depend upon the status of the logical volume as a standard or BCV device. If step 84 determines the WRITE request is to a standard device, step 84 transfers control to step 85. Step 85 sets a bit in the PB table for the identified track to a changed value for each session. That is, if these are two DDF sessions, DDF(1) and DDF(2), and a WRITE request identifies track 1 of the standard device 31, the track 1 bit in DDF(1) and DDF(2) columns of the PB table 72 (i.e., the PB (DDF(1),1) and PB (DDF(2),1) bits) will assume a "changed" value. In the following discussion, "C" will indicate a "changed" value; and "U", an "unchanged" value. The selection of a "1" or "0" bit value to designate a "changed" value is a matter of choice although in one specific implementation of this invention the "changed" value is "0". Step 85 then transfers control to step 86 and 87 that post a complete status and perform a WRITE operation before returning an acknowledgement that enables a WRITE PENDING flag for the track (not shown) to be cleared in step 90.

If the identified track is in a BCV device, such as the BCV(1) device 33 or BCV(2) device 35, step 84 transfers control to step 91. Step 91 sets to invalid the "M4" bit in the corresponding BCV track table. In a BCV operation, this bit is designated as an "M4b" bit. Assume that the HOST B application 23 in FIG. 1 generates a WRITE request to cylinder 0, track 0 in device 33. Step 91 causes the state of the M4b in row 64 of the Track ID table 63 to indicate an invalid state. In the following discussion "V" and "I" indicate the valid and invalid states respectively. In the Symmetrix implementations the V and I values are "0" and "1", respectively.

The following discussion uses the phrase "marked as" to refer to an action to be taken with respect to a bit position. As will be apparent, in most situations the state of a specific bit position will not be predictable. We use the phrase "marked as" to denote an overriding operation that is independent of the prior state.

Establish Command

With this background it will now be possible to discuss the various commands that enable multiple, independently, operating sessions using multiple copies of data from a standard device stored on BCV devices. Any such session begins when a host application or other source issues an ESTABLISH command. The ESTABLISH command identifies a standard device, such as the standard device 31, and a BCV device, such as one of the BCV devices 33 or 35. When a host adapter (HA), such as the host adapter 27 in FIG. 1, receives the command in step 100, it test for an error in step 101 to abort if any error should exist. If not, the host adapter issues an ESTABLISH request in step 102.

When the disk adapters receive the ESTABLISH request in step 103 a controller in a disk adapter (DA) determines whether the request identifies a session. If no session is involved, as would be true on an initial attempt to establish a relationship between standard and BCV devices, step 104 transfers control to step 105 that performs a number of tests and functions to include assigning a DDF session number and selecting a corresponding bit position in the PB table associated with the standard device. In addition, other functions could also be performed. Step 105 also assures that necessary resources are available. In the context of the system in FIGS. 1 and 2, step 105 could establish a DDF(1) session pairing the standard device 31 and the device 33 BCV(1). If any conditions are not met, an error message is sent. If all the tests are passed, step 105 transfers control to step 106 and the establish function continues in the same way as disclosed in U.S. Pat. No. 6,101,497. If a session has been defined for an ESTABLISH request, step 104 bypasses step 105 and transfers control to step 106.

Figure 4:
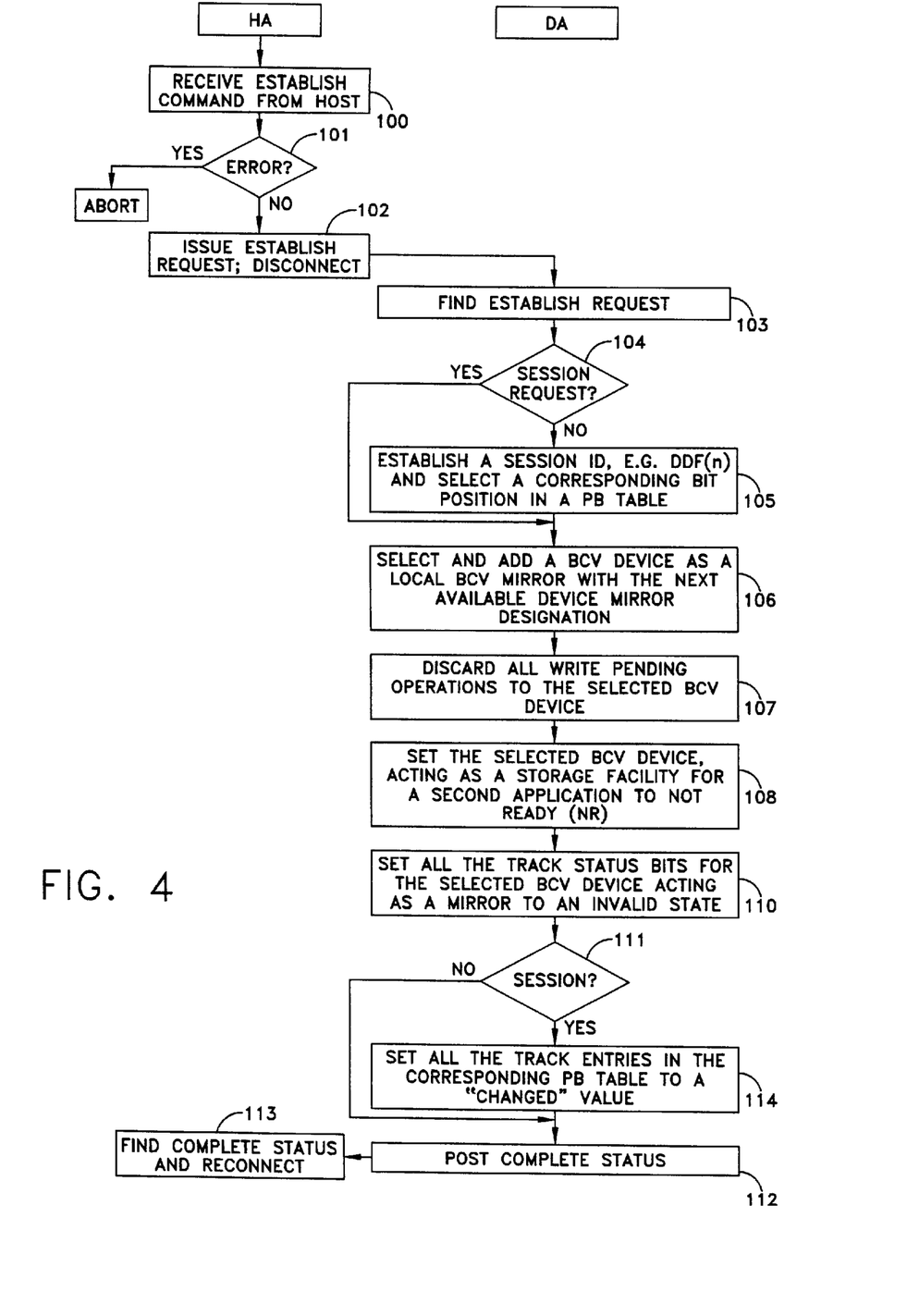
FIG. 4 depicts the procedure for establishing a connection in accordance with this invention.

The next sequence of steps effectively isolates the selected BCV volume from any corresponding application and connects the selected BCV device as a mirror to the standard device 31. As known, when this occurs a specific column of a track table or mirror position is designated as representing the status of tracks in the other mirror device. This is always selected as an unused mirror position. When this occurs the exact position may change and is called a moving mirror using the designation "MM". The ESTABLISH command sets to an invalid state all the moving mirror bits associated with the standard device. This enables the copy program on the standard device to copy data to the selected BCV device. When the BCV device synchronizes with the standard device, normal mirroring operations continue.

More specifically, step 106 selects and adds the corresponding BCV device as a BCV mirror with the next available standard device mirror as previously described. Various bookkeeping operations that do not form part of this invention, but are well known in the art, are also performed. Further communications between the BCV device and the program operating with it are no longer possible so step 107 discards all WRITE PENDING operations to the selected BCV device. Step 108 completes the isolation by setting to a NOT READY (NR) the selected BCV device in its function as a storage facility for a corresponding application.

Step 110 then sets all moving mirror (MM) track status bits in the standard device Track ID table to an invalid state. Any one of the unassigned M1 through M4 bit positions in the standard device can be assigned to represent the state of the mirror device. The assigned bit position is called the MM bit position. Marking as invalid all the MM bits assures that all the data from the standard device will be copied to the selected BCV device. If a conventional ESTABLISH command were issued, step 111 would transfer control to step 112 to post a COMPLETE status for transfer back to the host adapter in step 113 and for further transfer to the application issuing the ESTABLISH command. However, if, in accordance with this invention, a session is involved, step 111 interposes step 114 in the process. Step 114 marks as "changed" sets all the track entries associated with the session in the corresponding PB table. Thus if the ESTABLISH command is generated as the DDF(0) session, all the PB bits in all the PB tables, including the PB table 72, would reflect a "changed" value. Thereafter the COMPLETE status would be posted in step 112 and transferred in step 113. Once this process is complete, the copy program 37 in the disk adapter 30 copies all the data from the standard device 31 to the selected BCV device acting as a mirror.

Split Command

Once an ESTABLISH command has been issued, the relationship between the standard device and selected BCV device continues until after the synchronization of the BCV volume. Then a SPLIT command can effect a path between the BCV device and its corresponding application. For example, in FIG. 1 if the ESTABLISH command produces a BCV relationship between the standard device 31 and the BCV(1) device 33, the SPLIT command will isolate the standard and BCV devices 31 and 33 and reconnect the device 33 with the replicated data set to the HOST APP B application 23. The procedure, as set forth in FIG. 5, begins when a host adapter (HA) receives the SPLIT command in step 121. The host adapter tests various conditions in step 122. One particular test, for example, determines whether the BCV device is actually in synchronism with the standard device. If an error condition exists, step 122 diverts to step 123 to abort the response. Otherwise step 124 issues a SPLIT request to the device adapters, such as disk adapter (DA) represented in FIG. 5, and blocks any further communications to the device adapters from other hosts.

Figure 5:
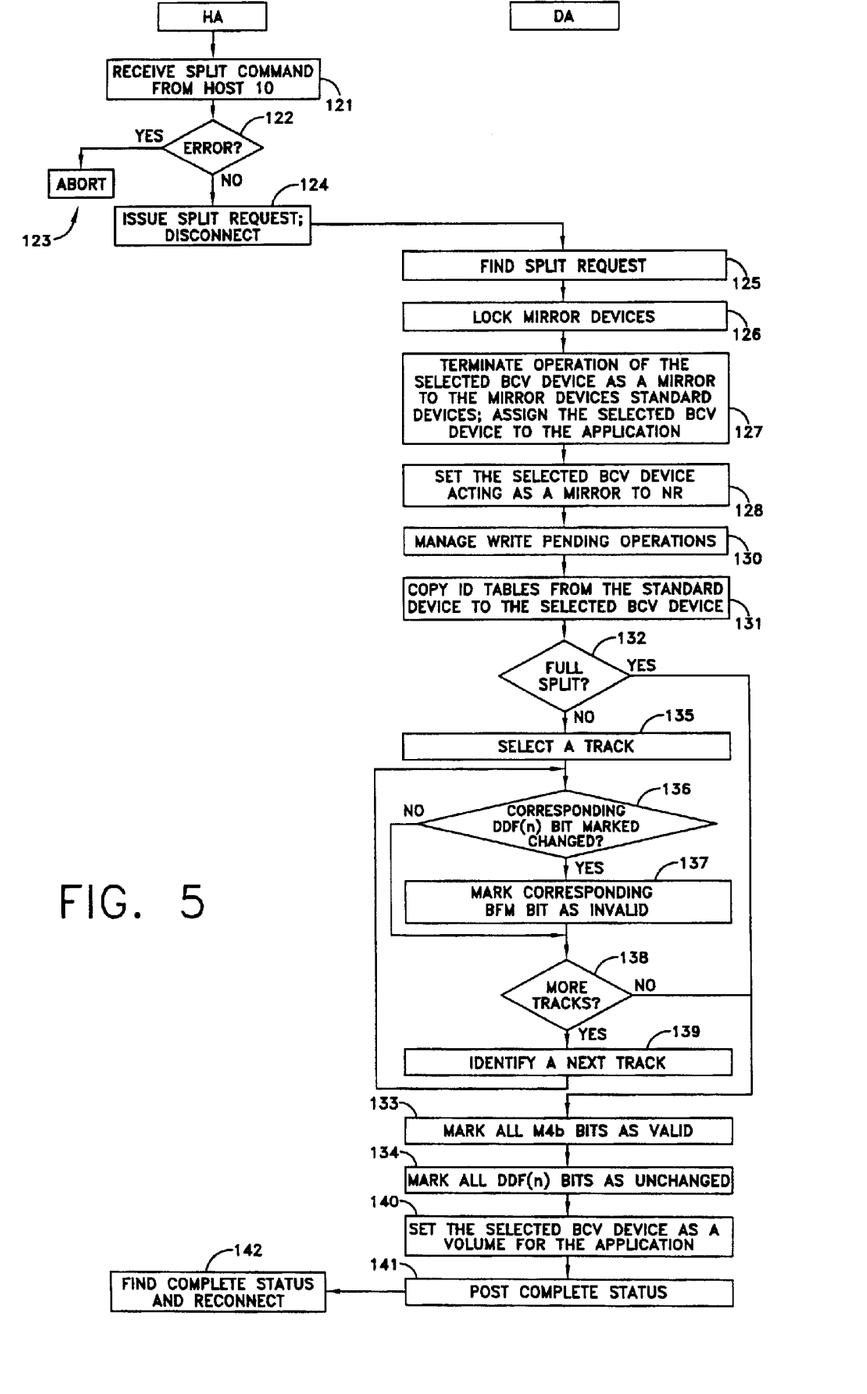
FIG. 5 depicts the procedure for a splitting operation that can be effected by the system in FIG. 1.

In step 125 the device controller for the selected BCV device receives the SPLIT command or request. Any mirror devices are locked in step 126 to prevent any activity during the response to the SPLIT command. This prevents any new WRITE requests from being posted from other hosts to the device while the response to the SPLIT command is in process. In step 127 the device controller associated with the selected BCV device removes the BCV mirror from the standard device and reassigns it to its original BCV application, such as the HOST APP B application 23 for the BCV(1) device 33. Various bookkeeping procedures such as updating certain device records to reflect a configuration changes are accomplished. Next the status of the BCV device in the context of its mirror operation is discontinued by setting the device acting as a mirror to a NOT READY (NR) state.

Step 130 manages any WRITE PENDING operations to the selected BCV device in a manner that is known in the art.

Control then transfers to step 131 to copy identification tables from the standard device to the selected BCV device.

Step 132 controls the subsequent operations depending upon whether the SPLIT command is a FULL SPLIT command as disclosed in U.S. Pat. No. 6,101,497 or a DIFFERENTIAL (DIFF) SPLIT command as disclosed in U.S. Pat. No. 6,209,002. If a FULL SPLIT command is involved, step 132 transfers control to step 133 to mark as valid all M4b bits i.e., the M4 bits in the selected BCV device Track ID table. Thus if the BCV device is device 33, all the M4 bits in the Track ID table 63 are marked as "valid". This indicates to the selected BCV device that its corresponding application has made no changes to the data.

If a DIFF SPLIT request is involved, a track-by-track analysis must be performed. Step 132 transfers control to step 135 that begins a loop by selecting a track. Step 136 then determines whether any intervening WRITE request has altered the data in the standard device by determining whether a corresponding bit is marked as "changed". If a DDF(n) bit is marked as "changed", step 136 transfers control to step 137. Step 137 marks as INVALID any corresponding BFM bit. A BCV volume may operate independently or in conjunction with other mirrors after it is split. If such mirrors exist, they are identified in the Track ID table for the BCV device. For example if the BCV device 33 operates with an M2 mirror, the M2 bit positions in the Track ID table would be designated as the BFM bits, with one bit being assigned to each track. If no such mirror device exists, step 136 does not change any bit values.

Step 137 then ends the loop by testing for more tracks. If more tracks exist step 138 transfers control back to step 135. Otherwise step 137 transfers control to step 133 to mark as valid all the M4b bits in the Track ID table for the selected BCV device.

After step 133 completes its function, control transfers to step 134 whereupon all DDF(n) bits for the session are marked as "unchanged". That is, if the SPLIT command identifies the session relating the standard device 31 with the BCV device 33, with a session identifier DDF(1) all the bits in the DDF(1) column of the PB table 72 shown in FIG. 2 would be marked as "changed". This assures that the PB table accurately reflects the replicated data on the selected BCV device.

Step 140 then sets the selected BCV device to a READY state with respect to its corresponding application. Step 141 posts a COMPLETE status for transfer back to the host adapter in step 142. When this occurs, the application corresponding to the selected BCV device, such as the HOST APP B application 23, for the BCV device 33, can interact with the replicated data in context that existed at the instant of the SPLIT command. Processing of this data then occurs in parallel with or concurrently with the processing of the application interacting with the standard device and any other application for processing data on any other BCV device, such as the HOST C APP application 24 with the BCV device 35.

As previously indicated, as an application, such as the HOST APP A application 22 in FIG. 1, alters tracks on the standard device 31, it marks the corresponding track positions within the Track ID table 55 in FIG. 2, and marks as "changed" the corresponding bits in the PB table 72 for all sessions. That is, if DDF(1) and DDF(2) sessions are active, a WRITE request to the standard device 31 changes the corresponding track locations for both the DDF(1) and DDF(2) columns in PB table 72.

Assuming, for example, that the related BCV device is the BCV device 33, the HOST APP B application 23 alters data on the BCV device 33. This marks as valid the M1 bit position for the changed track and marks as invalid the M4b bit position to indicate that the track is no longer in synchronism with the corresponding track on the standard device.

After a SPLIT command has been processed, different application programs issue WRITE requests that are handled in accordance with FIG. 3. Over time all the PB bits for a given session and the M4b bits for the corresponding BCV device collectively will indicate all the changes made to the BCV device and to the standard device on a track-by-track basis (i.e., with track granularity).

Reestablish Command

At various times it may be desirable to update the replicated data on a specific BCV device. One approach is to issue another ESTABLISH command. However, a REESTABLISH command will only transfer from the standard device to the selected BCV device the data in those tracks that have been changed in either of the devices. This can significantly reduce the transfer time over the time for processing an ESTABLISH command.

Figure 6:
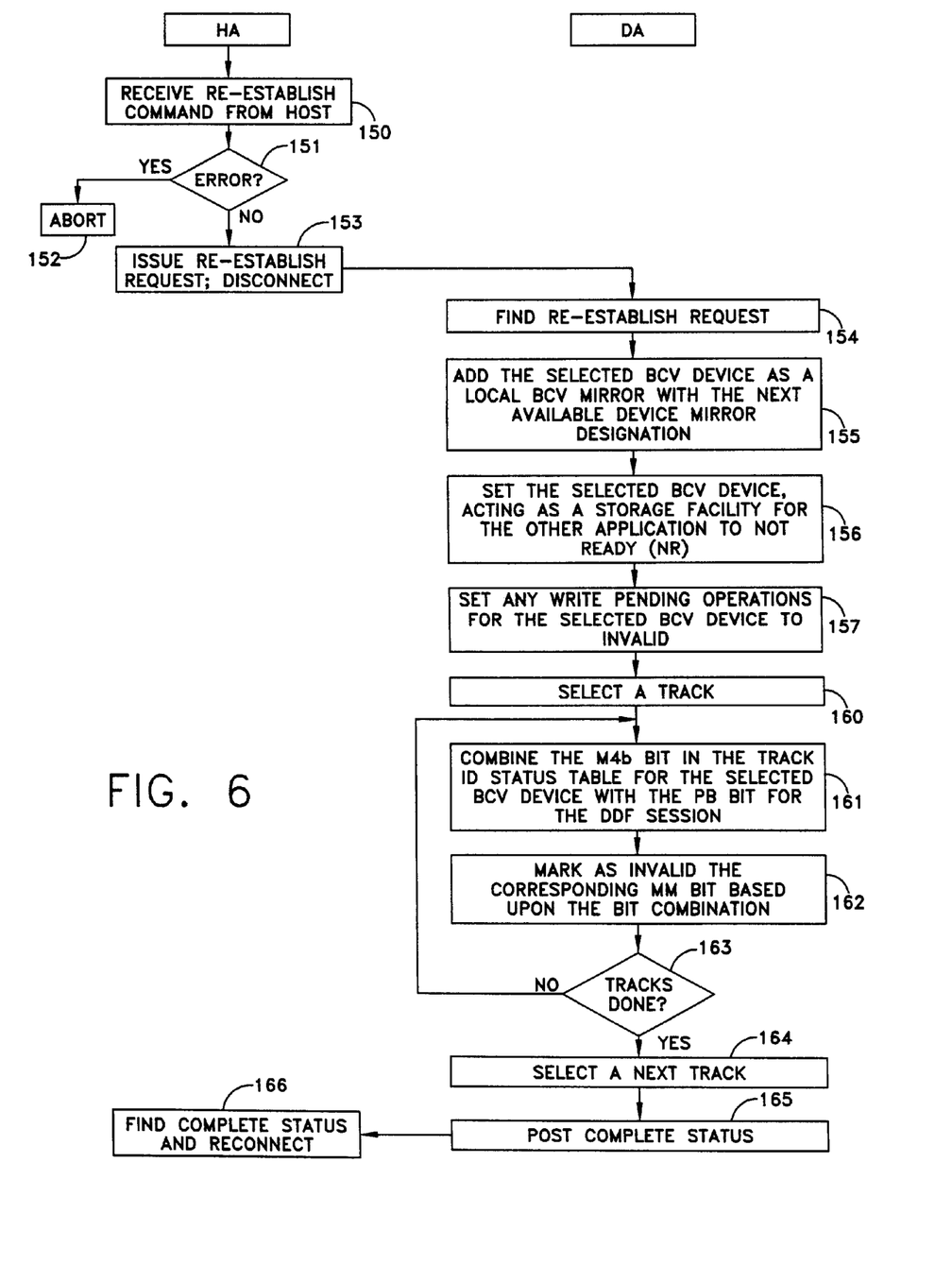
FIG. 6 depicts the procedure for re-establishing that can be effected by the system in FIG. 1.

FIG. 6 depicts the procedure followed by the host adapter (HA) and a selected device adapter (DA) in response to a REESTABLISH command. As in the previous cases, the host adapter receives the REESTABLISH command from the host in step 150 and tests for errors in step 151. If an error is found, step 152 aborts the process and issues an appropriate error code. In the prior system one such error occurred if the designated BCV device was not the device that initiated the ESTABLISH command. In accordance with this invention, that error no longer occurs because it is possible for the REESTABLISH command to identify any BCV device in a session. Assuming no errors exist, step 153 issues a REESTABLISH request to the disk adapter and then disconnects in a manner analogous to the disconnection accomplished in response to other commands.

In step 154 the device adapter receives the REESTABLISH request. Step 155 adds the selected BCV device as a local BCV mirror with the next available device mirror designation. In step 156 the BCV device is set to be NOT READY (NR) to the corresponding application, such as the HOST APP B application 23 with the BCV device 33 in FIG. 1. All WRITE PENDINGS to the BCV device are set to be invalid in step 157.

Step 160 then selects a track as a first step in a loop by which the storage device is analyzed on a track-by-track basis. Step 161 combines the track M4b bit for the selected track from the Track ID status table for the selected BCV device with the PB bit for the selected track for the DDF session. For example, if a DDF(1) session establishes a relationship between the standard device 31 and the BCV(1) device 33, step 161 combines the M4 bit from the Track ID table 63 in FIG. 2 with the corresponding PB bit from the DDF(1) column of the PB table 72 in a logical OR operation. The result identifies whether the specific track has been changed in either the standard device 31 or the BCV device 33.

Step 162 marks the corresponding MM bit based upon that bit combination. The combination is typically a logical OR operation. Step 163 then determines whether all the tracks have been analyzed. If not, step 164 selects a next track and transfers control back to step 160. Otherwise the analysis is complete and the system uses step 165 to post a complete status and transfer that status back through the host adapter to the source of the REESTABLISH command in step 166.

When the loop starting with step 160 ends, the MM bits in the standard device identify each track that needs to be transferred from the standard device to the selected BCV device. Then a copy program, typically the copy program associated with the standard device, uses the MM bits to control the transfers.

If the HOST APP A application 22 generates a WRITE request to the standard device 31 during this process, it will change the corresponding PB bit. However, the loop starting with step 160 operates so long as the RE-ESTABLISH command is active, so new data will be transferred to the selected BCV device on a subsequent split.

Restore Command

Figure 7:
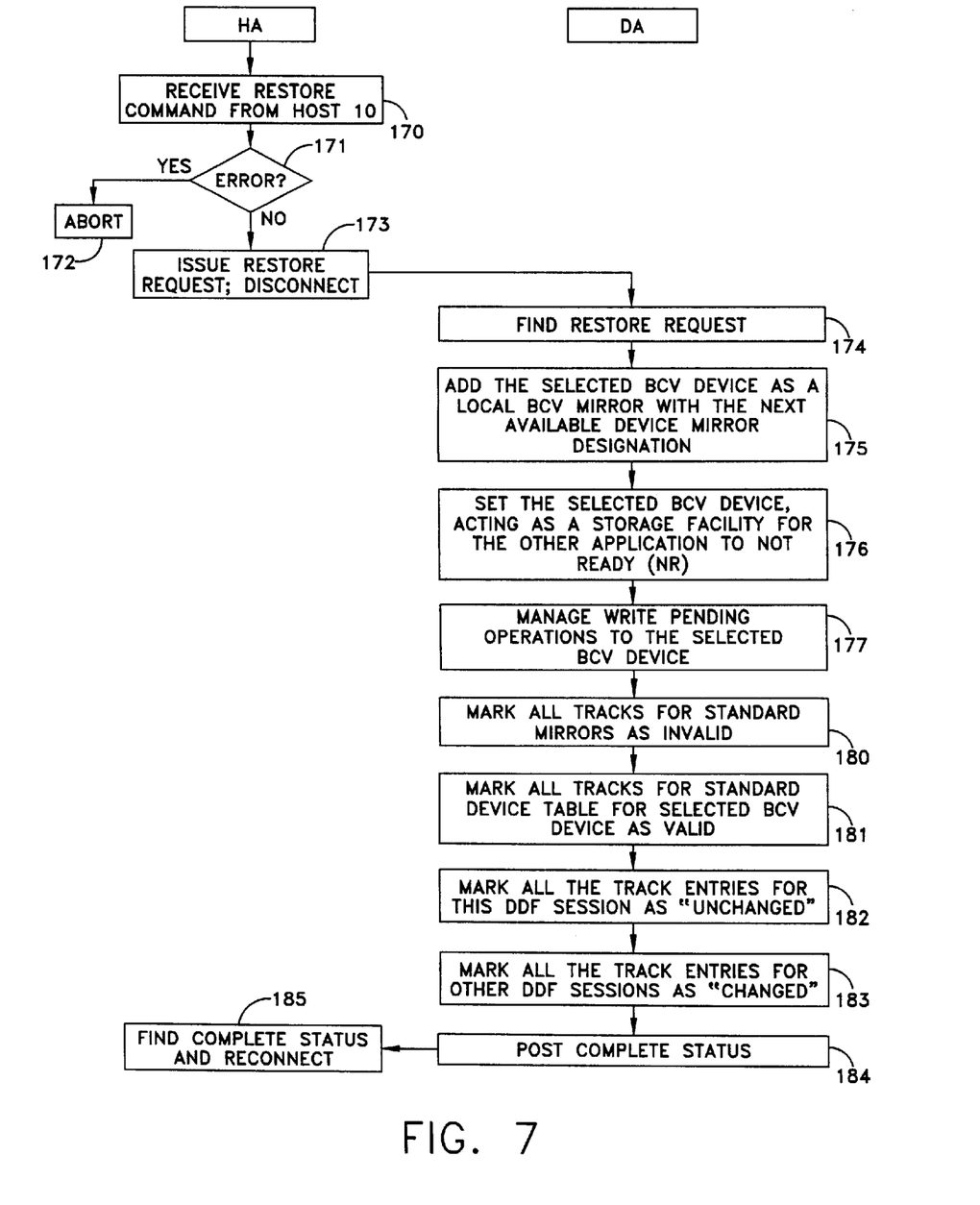
FIG. 7 depicts the procedure for restoring that can be effected by the system in FIG. 1.

FIG. 7 depicts a RESTORE command that restores all the data of the standard device from a selected BCV device. This procedure is useful if failure occurs in the standard device while the BCV device has a valid copy. For example, if one of the BCV devices were being used in a backup operation, no data would change after a SPLIT command. If a disk failure or file corruption event were to occur, the RESTORE command would restore data in the standard device in the version that existed at the time of the prior SPLIT command for the specific DDF session.

As shown in FIG. 7, the host adapter (HA) receives a RESTORE command in step 170 and tests for error conditions in step 171. An error condition, unique to the restore command, exists if the BCV device has invalid tracks, if there are WRITE PENDING operations to the standard device or if the standard device is characterized by a NOT READY (NR) status. Step 172 aborts any processing of the RESTORE command if any such error conditions exist.

If no error conditions exist, step 173 issues the RESTORE request and then disconnects. When the device adapter (DA) encounters the RESTORE request in step 174, it selects a next available standard mirror device designation for the selected BCV device in step 175. Step 176 isolates the BCV device from its application by indicating the device is no longer ready or available to the corresponding application.

Various pending WRITE operations are managed in step 177. If a WRITE PENDING operation to the selected BCV exists, the same WRITE pending cache slot is maintained, but its attributes are altered to reflect the device number of the standard device instead of the BCV device and to reflect that the mirror is now associated with the standard device as a mirror instead of the first available local mirror on the BCV device. Various write pending and in-cache flags are then set as known in the prior art.

As the execution of the RESTORE command assumes that only the selected BCV device contains valid data, the device controller uses step 180 to mark as invalid all the entries in the Track ID table for the standard device and any local mirrors. In step 181 the controller marks as valid all the tracks in the standard device table for the selected BCV device as valid. This is the MM bit that is resident in the Track ID tables 55 for the standard device. In step 182 all the track entries for the current DDF session are marked as "unchanged". That is, if the session involved is the DDF(1) session, all the tracks in the DDF(1) PB table 72 in FIG. 2 are set to an "unchanged" value. In step 183 the PB bits for all the other DDF sessions, such as the DDF(2) session, are marked as "changed". Step 184 posts a complete status and step 185 returns that status through the host adapter to the requesting application. With this, the copy program associated with the standard device then uses the state of the signals in the MM bits of the track tables, such as the Track ID table 55, to copy data from the selected BCV device and restore all the data to the standard device.

Incremental Restore Command

Figure 8:
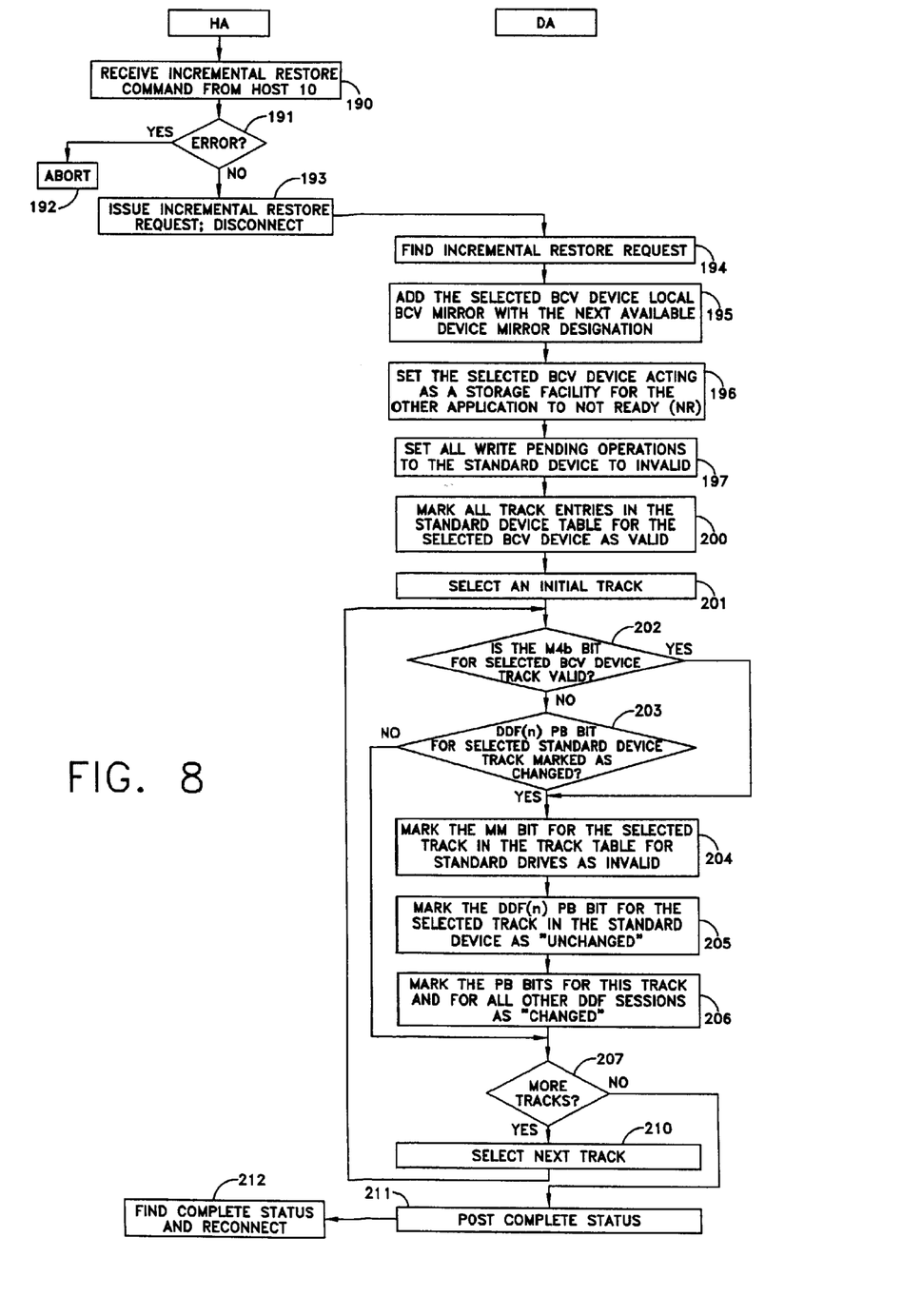
FIG. 8 depicts the procedure for incrementally restoring that can be effected by the system in FIG. 1.

The INCREMENTAL RESTORE command brings a standard device into synchronism with a selected BCV device by transferring only data from tracks in the BCV device corresponding to tracks that have changed in the standard device since the last SPLIT command. This can establish synchronization with the device without the costly overhead of performing a full restoration. FIG. 8 depicts the process whereby the host adapter (HA) receives the incremental restore command in step 190 and tests for an error 191, aborting in step 192 if an error exists. Otherwise control passes to step 193 that sends the incremental restore command onto the system bus to device adapters.

Step 194 represents the receipt of an incremental restore request in a device adapter (DA). Steps 195 and 196 operate the same way as steps 175 and 176 in FIG. 7. Step 197 handles any WRITE PENDING operations to the standard device by making them invalid. Step 200 marks as valid all the MM bits in the standard device table.

Next step 201 initiates a loop for a track-by-track analysis. For each track step 202 determines whether the M4b bit for the selected BCV device is valid. Step 203 determines whether the PB bit for the DDF(n) session is changed. In either case control transfers to step 204 to mark as invalid the MM bit in the standard device for the selected track. Step 205 marks as "unchanged" the corresponding PB bit for the DDF(n) session for the selected track. Then step 206 marks as "changed" all the PB bits for all other DDF sessions for that track.

Step 207 acts as a loop control to identify a next track in step 210 and transfer control back to step 202. When all the tracks have been examined, step 207 transfers control to step 211 that posts a complete status and allows step 212 to transfer this status through the host adapter to the application that issues the INCREMENTAL RESTORE command.

SPECIFIC EXAMPLE

Figure 9:
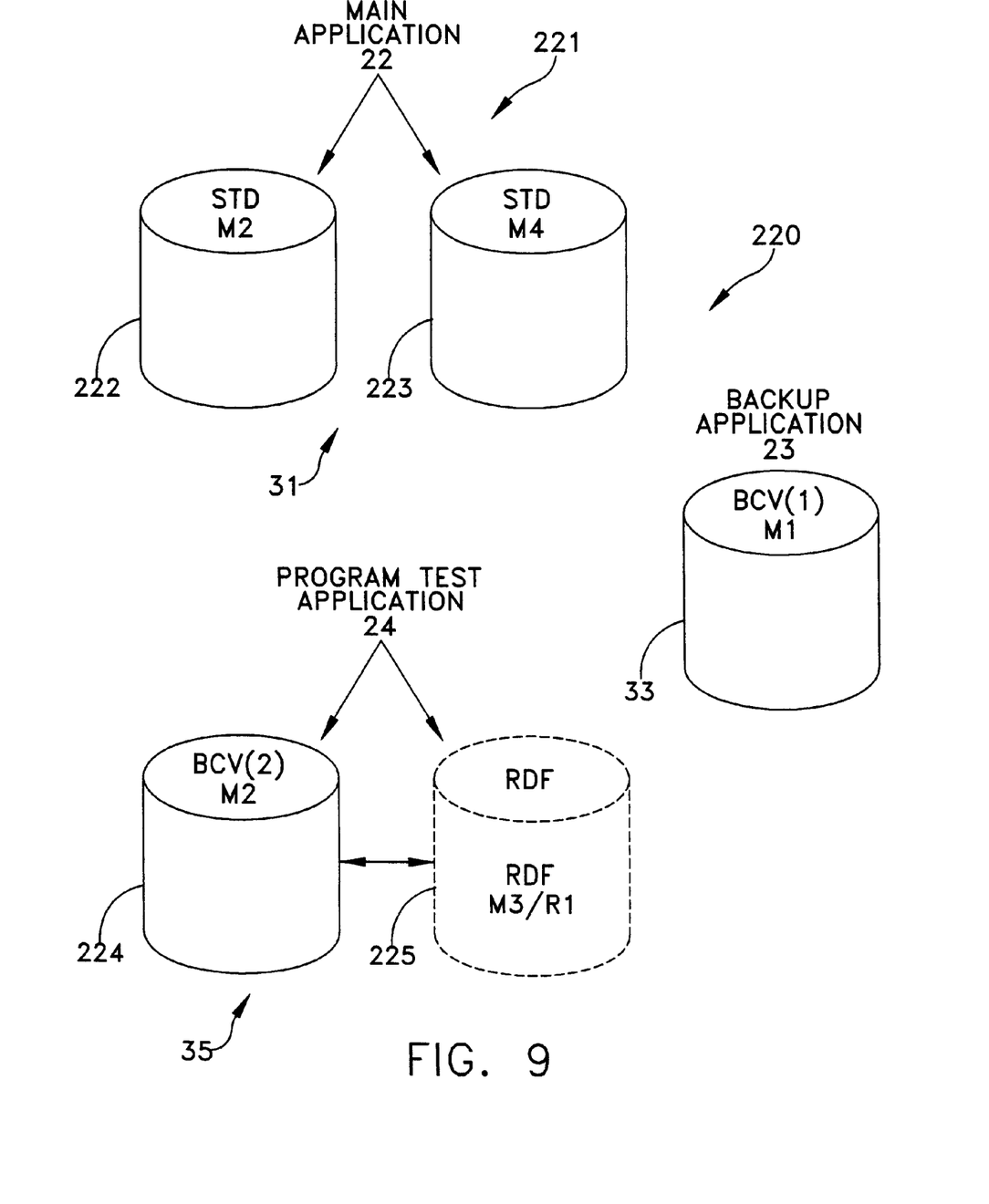
FIG. 9 depicts in schematic form some storage devices in a particular configuration that is useful in understanding the detailed operation of this invention.

Each of FIGS. 3 through 8 define specific operations. A further appreciation of this invention can be attained by referring to a specific example using a specific configuration command sequence. FIG. 9 depicts a data storage facility 220 with a standard device 31 that operates with a main application and with two mirrors. As there is no requirement for identifying specific mirror locations in any particular order, in FIG. 9 the standard device 31 assigns mirror 222 to be an M2 mirror and mirror 223, an M4 mirror. This leaves the M1 and M3 bit positions in a Track ID table unused. A first BCV device designated as BCV(1) device 33 is configured to provide data for backup operations. In this case a backup application 23 copies data from the BCV(1) device 33 to a tape backup or backup facility of other media on a periodic basis. This is assigned as the M1 mirror in its Track ID table. The M2 and M3 bits are unassigned. The M4 bit is the M4b bit position. The second BCV device, namely BCV(2) device 35 includes an M2 mirror 224 and an M3/RDF (remote data facility) mirror 225 designated as an M3/RI mirror. RDF mirrors are known in the art.

With this particular arrangement, alternate designations can be applied to the various Track ID table bits. The standard device 31 occupies the M2 and M4 bit positions. When a BCV device is used, a next available position is assigned to that BCV device. In the case of the standard device 31 in FIG. 9, the next available position is the M1 position and that becomes the MM bit position when the standard device connects to either of the BCV devices 33 or 35 during an ESTABLISH or REESTABLISH operation. The BCV(1) device 33 is defined as the M1 mirror and the M4 bit position is the M4b bit position. The M1 bit position is the MM bit position when the BCV device 33 is operating with its program. The BCV device 35 includes the BCV(2) device as an M2 mirror while its remote device is the M3/RI mirror. In this the case the M2 bit position is the MM bit position for the BCV device 35; and the M4 bit position becomes the M4b bit position. The RDF device 225 constitutes a fixed mirror, so the M3 bit position is also called a BFM (or BCV Fixed Mirror) bit position.

Figure 10:
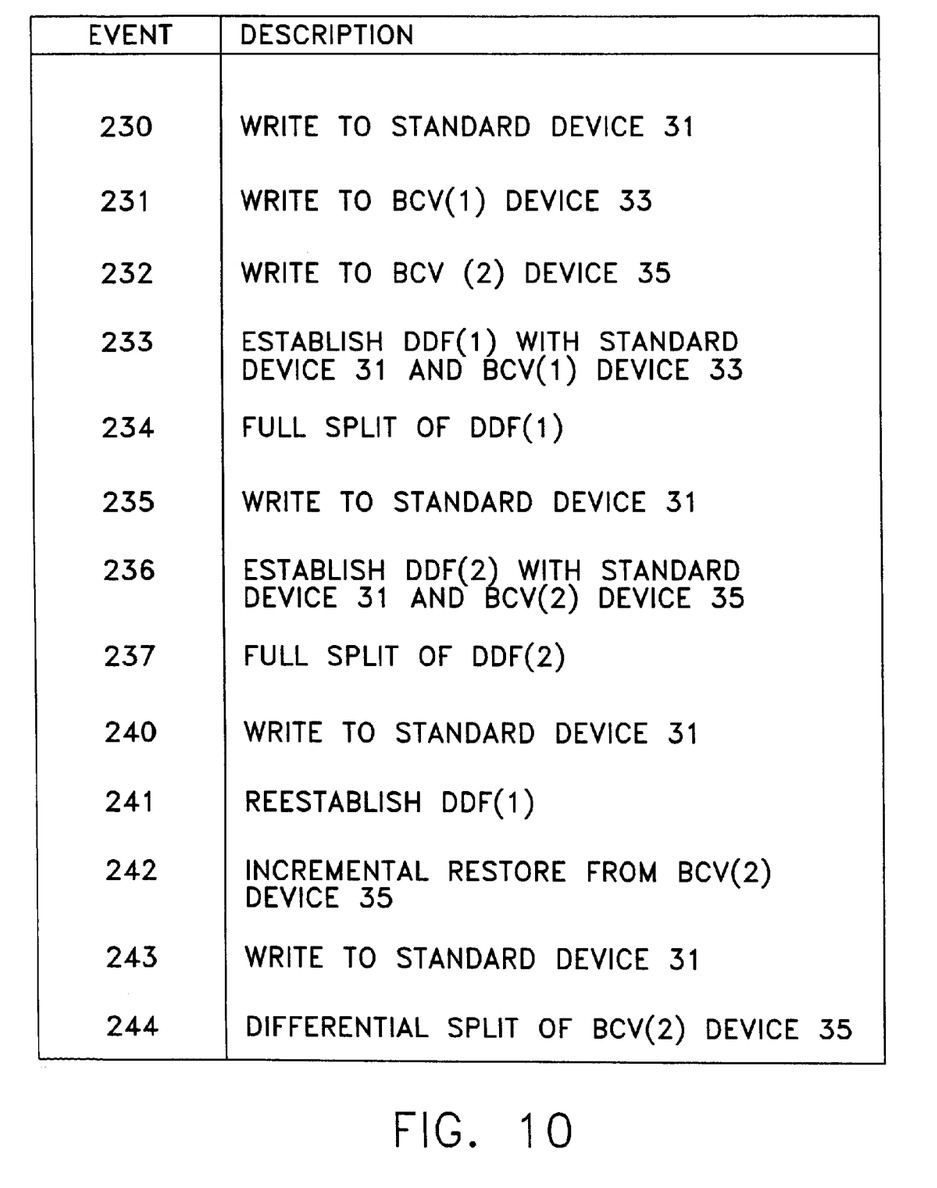
FIG. 10 is a chart that depicts various operating states that exist in a typical sequence of operations.

FIG. 10 depicts a sequence of events that could occur in the configuration shown in FIG. 9. At event 230, the HOST APP A application 22 writes to a specified track in the standard device 31. When this occurs, both the DDF(1) and DDF(2) bits for that track are marked as "changed" because the request is to a standard device and the operation of FIG. 3 continues even when no sessions are active. The M1 bit in the Track ID table for that track is marked as "invalid" while the M2 and M4 bits are marked as "valid". As the M3 bit is not used, its value is assigned according to a general rule that requires any unused bits to always be marked as "invalid". No changes are made to any other track.

Event 231 depicts an operation whereby the HOST APP B application 23 writes to a track in the BCV(1) device 33. In this case no change occurs in the DDF(1) or DDF(2) values or the Track ID tables 55 or 71. Track ID table 63 does change. Specifically, the M1 bit will be marked as "valid" and the M4, or M4b, bit will be marked as "invalid". The M2 and M3 bit positions, having no corresponding devices, remain marked as "invalid" throughout this sequence of events.

Event 232 depicts a similar operation when a WRITE request from the application 24 identifies a track on the BCV(2) device 24. In this case the M2 and M3 bits in Track ID table 71 for the corresponding track are marked as "valid" while the M4, or M4b, bit is marked invalid.

Now assume it is desired to establish a first session between the standard device 31 and the BCV device 33. An application generates an ESTABLISH command identifying these devices. Immediately upon completion of the ESTABLISH command processing as shown in FIG. 4, all the track bit positions in the DDF(1) entry for the PB table will be marked as "changed". The corresponding tracks for the DDF(2) session will remain unaffected. As a result, the copy program associated with the standard device 55 will replicate all the data from the standard device 31 to the BCV(1) device 33. As each track is transferred, the corresponding MM bit position in the standard device Track ID table 55 will be marked as "valid". All M1 bits in the table 63 will be marked as "valid" as data transfers into corresponding tracks of the BCV(1) device and the corresponding PB bits for the DDF(1) session will be marked as "changed".

Event 234 represents the response to a FULL SPLIT command for the DDF(1) session. As shown by steps 133 and 134 in FIG. 5, all the M4b bits in the Track ID table 63 are marked as "valid" and all the PB bits for the DDF(1) session are marked as "unchanged".

Event 235 represents a situation in which the HOST APP A application 22 writes data to a track in the standard device 31. As shown in FIG. 3, this write request will mark as "changed" both the DDF(1) and DDF(2) sessions for the corresponding track. Other PB bits for other tracks are not altered.

Step 236 represents the establishment of the DDF(2) session between the standard device 31 and the BCV(2) device 35. Now all the values in the DDF(2) portion for the Track ID table 72 are marked as "changed". With this relationship, each M1 bit in the standard device Track ID table 55, as an MM bit, points to a track the BCV(2) device 35 so the values of all the M1 bits are marked as "invalid". When synchronism is achieved, the M2 and M3 bit positions in the Track ID table 71 for the BCV(2) device 35 are marked as "valid". Also the M4 bit, as the M4b bit for this session, is marked as "valid". No change occurs to the Track ID table 63.

As the data is synchronized, the M1 bits in the Track ID table 55 for the standard device 31 are marked as "valid". When the system subsequently issues a FULL SPLIT operation for the DDF(2) session in event 237, all the M4b bits in the BCV(2) device Track ID table 71 are marked as "valid". The DDF(2) PB bit position for each track is marked as "unchanged".

Assuming again that the HOST APP A application 22 writes data to a track in the standard device 31 in event 240. The standard device responds by marking as "changed" the PB bits in the corresponding track positions for both sessions. No other changes are made.

Now assuming it is desired to update the DDF(1) session by reestablishing the synchronism between the BCV(1) device 33 and the standard device 31. In accordance with this invention event 241 processes the REESTABLISH command. As shown in FIG. 6, for each track the system will combine the M4 bit for the Track ID status table for the selected BCV device and the PB bit for the DDF session and the MM bit in the Track ID table 55 is set to "invalid". If between the split of the BCV device 33 in event 234 and the reestablishment in event 241 the HOST APP B application 23 had altered any track, the M4b bit in the Track ID table 63 would be marked as "invalid" and would also have to produce a change in the M1 bit of the Track ID table 55 whether the corresponding PB bit for the DDF session were marked as "changed" or not. Once the pair is reestablished, a copy program transfers the data in each marked track, the corresponding DDF(1) bit will be marked as "unchanged" and each corresponding M4b bit will be marked as "valid" in the Track ID table 63.

Event 242 represents a decision to restore data incrementally from the BCV device 35. The BCV device might, for example, have an updated version of the information on the standard device 31. At the end of the incremental restore operation, all the M1 bits in the Track ID table 55 for the standard device are marked as "valid". The DDF(2) bits in the PB table 72 are marked as "unchanged" while the DDF(1) bits are marked as "changed". This signifies that the data in the other BCV devices, such as the BCV device 33, no longer contain replicas of the data in the standard device 31. However, marking the DDF(1) bits as changed assures the transfer of that correct data in response to a next REESTABLISH or ESTABLISH command procedure involving another BCV device, such as the BCV(1) device 33 in this example.

Event 243 represents another write operation to the standard device 31. The standard device 31 responds by marking as "changed" all the PB positions for the altered track or tracks in all the DDF sessions.

Event 244 represents the receipt of a DIFF SPLIT command to detach the BCV(2) device 35 from the standard device 31. When this occurs, step 137 in FIG. 5 will mark as "invalid" the bit position in the Track ID table 71 corresponding to the BFM bit for the M3/R1 mirror 225 in FIG. 9. The BFM bit will be the M2 bit in the Track ID table 71. This assures that the change propagates the M3/R1 mirror 225.

The foregoing example represents one of many sequences of events that can occur with respect to a single track. It will be apparent, however, that data in other tracks will be altered and that more complicated sequences can be developed. However, FIGS. 9 and 10 demonstrate the ability to establish multiple session involving a single standard device and different BCV devices. This provides a powerful tool because the transfers in response to the various commands all occur independently of and transparently to the interaction between the primary host application and a standard device, such as the HOST APP A application 22 and the standard device 31. The transfers that are produced during the DIFFERENTIAL SPLIT and REESTABLISH and INCREMENTAL restores are limited to only those changes that need to be made. Also, data is replicated and used without danger of corrupting any of the data on the standard device 31.

This invention has been described in terms of a specific embodiment involving a particular data storage facility utilizing tracks as a basic storage unit and maintaining a track-by-track analysis and status. The invention is readily adapted to other levels of granularity including files, records or sectors. Specific commands and sequences have been disclosed. It will be apparent that many of those sequences could be altered and different steps might be incorporated to achieve the similar results. Therefore, it is the intent of the appended claims to cover all such variations and modifications as come within the true spirit and scope of this invention.

What is claimed as new and desired to be secured by Letters Patent of the United States is:

1. In a data processing system in which a first application program is adapted to interact with data in a first storage device located on a first physical disk storage unit, a control for enabling at least two additional programs to interact concurrently and independently with copies of the data stored in the first storage device, said control comprising:
   A) device identification means for identifying additional storage devices on different physical disk storage units for each of the additional programs,
   B) session reference means for defining a session reference for each of the additional storage devices, each session reference having entries for recording each change made to a corresponding portion of the data on the first storage device,
   C) recording means for recording each change to a data portion on the first storage device in the corresponding entry of the session references,
   D) device reference means for defining a device reference for each of the first and additional storage devices with entries for recording each change a respective program makes to a data portion,
   E) copy generation means for generating independent copies of the data in the first storage device on the other storage devices for interaction with the respective additional programs,
   F) device change recording means for recording in said device reference means each change each additional program makes to a data portion stored in its respective storage device,
   G) updating means for updating data portions on a selected one of the additional storage devices on demand by combining the entries in said corresponding session and device references to identify changed data portions, and
   H) copy means for copying the changed data portions from the first storage device to the selected storage device.

2. A control as recited in claim 1 wherein said copy generation means includes:
   i) establishing means for establishing a session that identifies the first storage device and one of the additional storage devices as a selected storage device,
   ii) synchronizing means for synchronizing the data an the selected storage device with the data on the first storage device, and
   iii) splitting means, operable after achieving synchronism, for splitting the one additional storage device from the first storage device thereby to enable the interaction between the selected storage device and its corresponding program.

3. A control as recited in claim 2 wherein said splitting means includes means for marking as unchanged each entry in said session reference means tar the selected storage device and marking as valid each entry in the corresponding device reference means.

4. A control as recited in claim 2 wherein each entry in said device reference means has multiple entry sets for different storage devices and said splitting means includes:
   i) first marking means for marking as invalid entries in one entry set of said device reference means that corresponds to another storage device that is a mirror for the selected storage device if a corresponding entry in said session reference means is marked as changed,
   ii) second marking means for marking as valid entries in one entry set for said selected storage device corresponding to the first storage device, and
   iii) third marking means for marking as unchanged all the entries in said session reference means.

5. A control as recited in claim 4 including a restoring means for restoring data to the first storage device from a selected storage device including:
   i) fourth marking means for marking as invalid all the entries in one entry set in said device reference means for first storage device corresponding to said first storage device,
   ii) fifth marking means for marking as valid all the entries in one entry set in said device reference means for the first storage device corresponding to the selected storage device,
   iii) sixth marking means for marking as unchanged all the entries in said session reference means for the selected storage device, and
   iv) seventh marking means for marking as changed all the entries in the others of said session reference means whereby data in the selected storage device restores the data in the first storage device and enables the subsequent transfer of data to any non-selected storage device.

6. A control as recited in claim 1 including restoring means for restoring the data in the first storage device limited to data that was changed in the first storage unit since a prior splitting of the first and the selected storage device, said restoring means including:
   i) fourth marking means for marking as valid all the entries in one entry set in said device reference means for the first storage device corresponding to the selected storage device,
   ii) fifth marking means for marking as invalid all the entries in one entry set in the first storage device corresponding to the first storage device if the corresponding entry in said device reference means for the selected storage device is valid or if the entry in the session reference means for the selected storage devices is changed, iii) sixth marking means for marking as unchanged all the entries in said session reference means for the selected storage device, and iv) seventh marking means for marking as changed all the entries in the other of said session reference means whereby only data portions corresponding to changed entries in the first and selected storage devices transfer to the first storage device and whereby the system is enabled to transfer restored data to any non-selected storage device.

7. A control as recited in claim 1 each said session reference means identifies the first storage device and a selected storage device and wherein each of the first and additional storage devices stores each data portion in a data track, said device reference means including entry defining means for defining a first entry set corresponding to itself and a second entry set corresponding to the other storage devices, each of said session reference and device reference means establishing a correspondence between corresponding entries and a track.

8. A control as recited in claim 7 wherein said copy generation means includes:
 i) establishing means for establishing a session that identifies the first storage device and a selected storage device,
 ii) synchronizing means tar synchronizing the data on the selected storage device with the data on the first storage device, and
 iii) splitting means operable after achieving synchronism for splitting the selected storage device from the first storage device thereby to enable the interaction between the selected storage device and its corresponding program.

9. A control as recited in claim 8 wherein said splitting means includes means for marking as unchanged each track entry in said session reference means for the selected storage device and marking as valid the corresponding track entry in said device reference means.

10. A control as recited in claim 8 wherein said splitting means includes:
 i) first marking means for marking as invalid in said device reference means for the selected storage device those track entries in the entry set for any mirroring storage device if the corresponding track entry in said session reference means for the selected storage device is changed,
 ii) second marking means for marking as valid in said device reference means for the selected storage device, those track entries in the entry set for the first storage device, and
 iii) third marking means for marking as unchanged all the track entries in said session reference mans for the selected storage device.

11. A control as recited in claim 7 including restoring means for restoring data to the first storage device from a selected one of the other storage devices, said restoring means including:
 i) fourth marking means for marking as valid all the entries in the entry set in said device reference means for the first storage device corresponding to the selected other storage device,
 ii) fifth marking means for marking as invalid all the track entries in the entry set in the first storage device that corresponds the first storage device, iii) sixth marking means for marking as unchanged all the track entries in said session reference means for the selected storage device, and iv) seventh marking means for marking as changed all the track entries in the others of said session reference means whereby data in the selected one of the additional storage devices restores the data in the first storage device.

12. A control as recited in claim 7 including restoring means for restoring data to the first storage device limited to data in tracks of the first and the selected storage devices that occurred since a prior splitting of the first and the selected storage devices, said restoring means including:
 i) fourth marking means for marking as valid all track entries in the entry set for the device change reference for the first storage device corresponding to the selected storage device,
 ii) fifth marking means for marking as invalid all the track entries in the entry set in the first storage device corresponding to itself if the corresponding track entry in said device reference means for the selected storage device is valid or if the track entry in said session reference means for the selected storage device is changed,
 iii) sixth marking means for marking as unchanged all track entries in said session reference means for the selected storage device, and
 iv) seventh marking means for marking as changed all the track entries in the other of said session reference means whereby only data portions corresponding to changed entries in the first and selected storage devices restore the data in the first storage device.

13. A control for a multi-processor data processing system including a data storage facility wherein one program operates with data in one data storage device, said control enabling multiple copies of the data on the one storage device to be made on each of additional data storage devices for operation with other programs, said control comprising:
 A) means for defining a first buffer for each additional storage device on which a copy is to be made,
 B) means for defining a second buffer for each additional data storage device and the one data storage device,
 C) means for copying the data on the one data storage device to one of the additional data storage devices,
 D) means for enabling an other program to interact with the data on the one additional data storage device independently of the data on the one data storage device,
 E) first recording means for recording each change made by the one program to the data on the one data storage device in each of said first buffers,
 F) second recording means for recording each change made by the program to its corresponding additional storage device in said corresponding second buffer,
 G) means operable upon completion of the independent interaction for combining the information in said corresponding first and second buffers to identify data to be copied from the one data storage device to the one additional data storage device thereby to enable said copying means to copy data to the one additional data storage device so it reflects the data in the one data storage device.

* * * * *